United States Patent Office 2,903,950
Patented Sept. 15, 1959

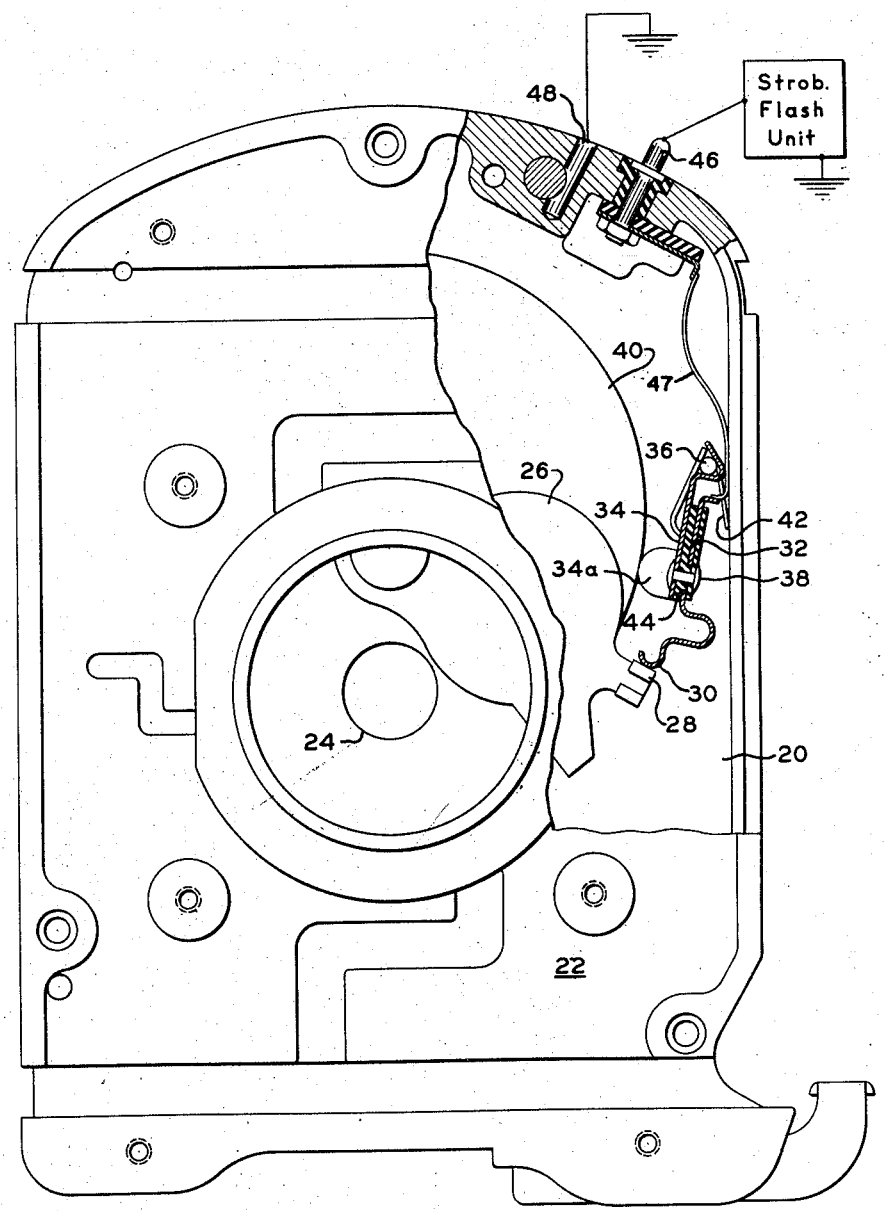

2,903,950

PHOTOGRAPHIC APPARATUS

Murry N. Fairbank, Belmont, Mass., assignor to Polaroid Corporation, Cambridge, Mass., a corporation of Delaware Application August 28, 1953, Serial No. 377,171

2 Claims. (Cl. 95—11.5)

This invention relates to photographic apparatus and more particularly to shutter mechanism comprising novel means for actuating in synchronism therewith a stroboscopic flash exposure means.

In the copending application of Murry N. Fairbank, Serial No. 58,258, filed November 4, 1948, for Combined Shutter and Diaphragm Mechanism for Cameras (now Patent No. 2,662,457, issued December 15, 1953), there is shown a novel shutter structure comprising an aperture-covering element or blade mounted for substantially free rotation and normally held by suitable holding means in a stationary aperture-covering position. The structure includes suitable means for applying a sharp impact to the blade to rapidly move the same so as to disengage it from its holding means and so as to uncover the exposure aperture. There is provided in the path of movement of the blade suitable rebound means for engaging a portion of said blade for the purpose of reversing the direction of rotation of said blade.

An object of the invention is to provide, in a shutter mechanism of the type having a rotary shutter blade and means for reversing the motion of said shutter blade, a rebound member, said member providing in combination with said shutter blade, a novel means for actuating a stroboscopic flash exposure means in synchronism with said shutter.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description, taken in connection with the accompanying drawing, which is a rear elevational view, partially in cross section and with parts broken away, of a portion of a shutter embodying the present invention, the stroboscopic flash unit and electrical connections therefor being shown schematically.

In accordance with the present invention there is provided a shutter mechanism of the same general structure as disclosed in the aforementioned patent and having a rotary shutter blade and a rebound member interposed in the path of said shutter blade. A rebound member generally comprising a spring element secured to suitable mounting means may be positioned to intersect the arcuate path of a portion of the shutter blade so that said portion hits a portion of the rebound member and rebounds therefrom. A suitable dielectric material is secured between the rebound member and the mounting means to which it is secured so as to insulate said member from said means. The rebound member comprises a contact of a stroboscopic flash circuit which, when grounded by contact with the shutter blade, completes the circuit to energize the stroboscopic flash at the instant when the shutter blade is at full aperture-uncovering position.

Referring now to the drawing, there is shown a camera shutter of the type which embodies the present invention. As a means for supporting and enclosing the various components of the shutter, there is provided a housing having a front portion 22 and a rear portion 20. Rear portion 20 is provided with an opening in which may be mounted a lens means generally indicated at 24, it being understood that the shutter comprises the elements and structure disclosed in the aforementioned patent. Shutter blade 26 pivotally mounted on housing portion 22 is illustrated in full aperture-uncovering position with lug 28 thereof in contact with rebound spring 30. Shutter blade 26 may be of any metallic conductive material, as for example, aluminum or steel.

A preferred embodiment of the rebound member generally indicated at 32 comprises an arm 34 pivotally mounted on pin 36 secured to housing portion 20, and rebound spring 30 affixed to arm 34, preferably by rivet 38. Arm 34, as shown, is provided with a cam following portion 34a adapted to coact with cam 40 for pivoting rebound spring 30 from the arcuate path of shutter blade 26 and allowing blade 26 to pass unobstructed by spring 30 for contacting other rebound springs (not shown) to lengthen the time interval of exposure. Torsion spring 42 coiled around pin 36 is provided for resiliently holding cam following portion 34a in contact with cam 40. Insulating material 44 is interposed between spring 30 and arm 34 so as to insulate spring 30 from arm 34 since the latter may be grounded on the housing. Rebound spring 30 is suitably connected by a wire 47 to the inner end of a flash connector plug of conventional type and indicated at 46. Plug 46 is suitably connected, as indicated in the drawing, to a stroboscopic flash exposure unit, the latter being grounded in the shutter housing, as for example, by a suitable plug inserted in receptacle 48.

When blade 26 is pivoted counterclockwise (as viewed in the drawing) to full aperture-uncovering position, lug 28 contacts spring 30 closing the stroboscopic flash circuit, the spring then causing the blade to bounce back toward its aperture-covering position. It is to be noted that the stroboscopic flash circuit is thus closed when the shutter blade is intercepted at the mid-point of its total arcuate travel from aperture-covering position to aperture-uncovering position and back to aperture-covering position.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. A photographic exposure system comprising, in combination, a photographic shutter including an aperture-covering element of electrically conductive material, means for mounting said element for movement from an aperture-covering position, a rebound member having an electrically conductive spring portion and being pivotally mounted in an operative position wherein said spring portion intersects the path of travel of said element during movement from said aperture-covering position for momentarily engaging a portion of said element and for reversing the direction of movement of said element, said rebound member comprising an arm having a cam follower portion adapted to coact with a cam for pivoting said rebound member between said operative position and an inoperative position wherein said rebound member is out of said path of travel thereby lengthening the total travel of said element, said spring portion being secured to said arm and insulated therefrom by electrically insulating material, means for electrically grounding said element, a stroboscopic flash unit, means for grounding said unit, and means for electrically connecting said unit with said spring portion, said element and said rebound member comprising the contacts of a switch for completing an electrical circuit to actuate said flash unit by the momentary engagement of said element and said rebound member.

2. A shutter mechanism for a photographic device comprising a housing having an aperture therein, a shutter blade for covering said aperture formed of an electrically conductive material, means mounting said blade for rotary movement from an aperture-covering position, reversing means including an electrically conductive rebound spring member, mounting means for said rebound member and mechanism carried by said mounting means for positioning said rebound member in or out of the path of rotary movement of said blade from aperture-covering position and for causing said member, when in position in said path, to momentarily engage said blade and reverse the direction of rotary movement of said blade so as to return said blade to aperture-covering position, the total travel time of said blade being a function of the position of said rebound spring member, means for grounding said shutter blade, means for insulating said rebound member from said mounting means, a stroboscopic flash unit, means for grounding said unit, and means for electrically connecting said unit with said spring member, said blade and said spring member comprising the contacts of a switch for completing an electrical circuit to actuate said flash unit by momentary engagement of said blade and said spring member.

References Cited in the file of this patent

UNITED STATES PATENTS

| 2,422,018 | Hutchison | June 10, 1947 |
| 2,453,321 | Hutchison | Nov. 9, 1948 |
| 2,490,755 | Hutchison | Dec. 6, 1949 |
| 2,531,936 | Fairbank et al. | Nov. 28, 1950 |
| 2,550,698 | King et al. | May 1, 1951 |
| 2,638,039 | Bucky | May 12, 1953 |
| 2,720,144 | Kaden | Oct. 11, 1955 |

FOREIGN PATENTS

| 427,350 | Great Britain | Apr. 23, 1935 |